Aug. 15, 1950     G. C. RAY ET AL     2,519,284
METHOD OF ABSORBING CARBON MONOXIDE
Filed Oct. 7, 1946
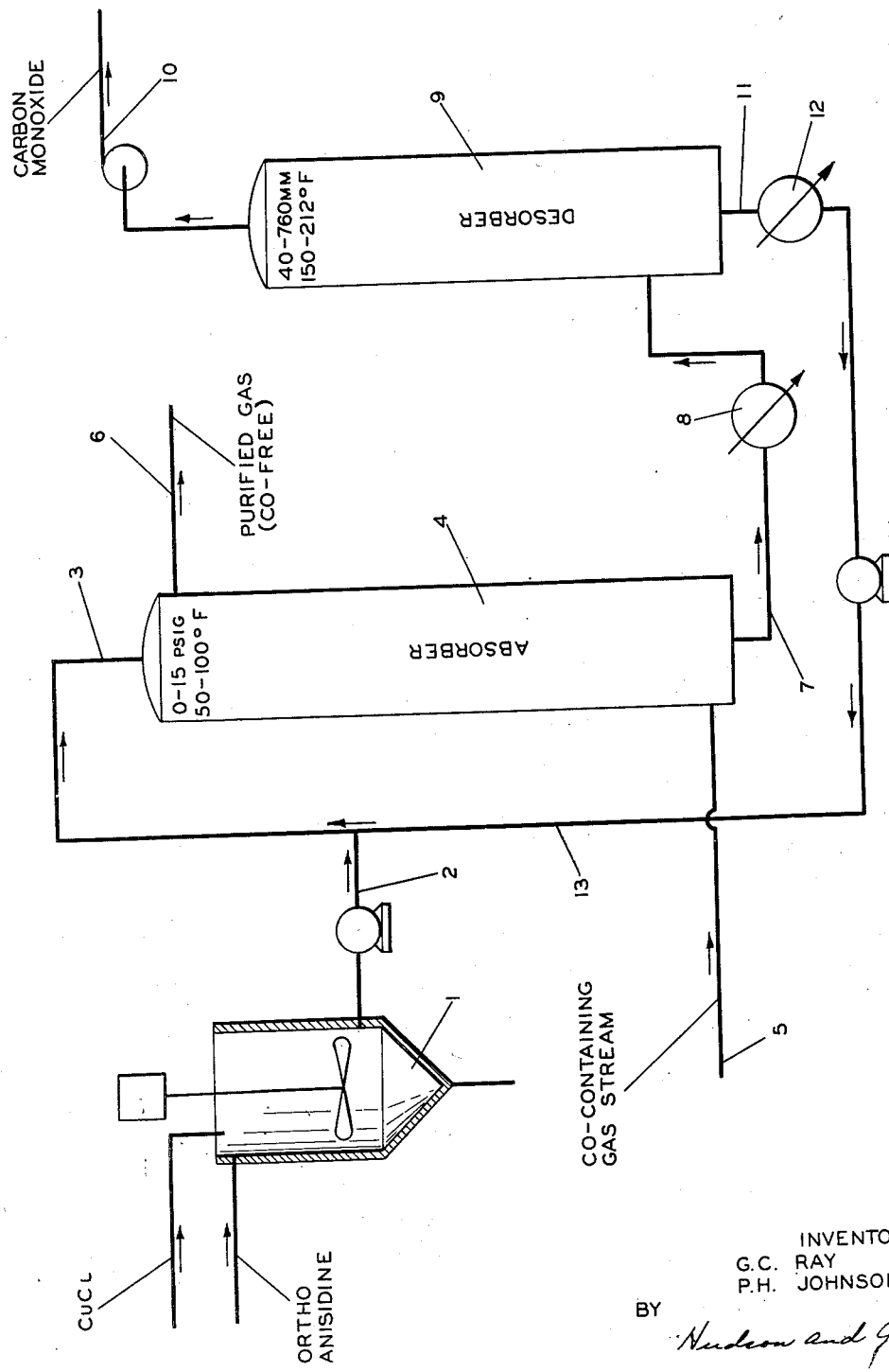
INVENTORS
G.C. RAY
P.H. JOHNSON
BY
Hudson and Young
ATTORNEYS Patented Aug. 15, 1950

2,519,284

UNITED STATES PATENT OFFICE 2,519,284

METHOD OF ABSORBING CARBON MONOXIDE

Gardner C. Ray and Paul H. Johnson, Bartlesville, Okla., assignors to Phillips Petroleum Company, a corporation of Delaware Application October 7, 1946, Serial No. 701,724

22 Claims. (Cl. 23—204)

This invention relates to the absorption of carbon monoxide and particularly to the removal of carbon monoxide from a gaseous mixture containing same together with at least one other gaseous material. In a typical embodiment it relates to a process for the separation and recovery of carbon monoxide from a gaseous mixture containing same by absorption in a reagent solution containing a cuprous salt and subsequently desorbing the resulting solution to recover the absorbed carbon monoxide in concentrated or substantially pure form.

It is well known that cuprous chloride, when dissolved in a suitable solvent is an agent for the absorption of carbon monoxide. The usual solvents for cuprous chloride have been hydrochloric acid or ammoniacal solutions. These solvents have the distinct disadvantage of being able to dissolve only small amounts of cuprous chloride. Furthermore the hydrochloric acid-containing solutions are extremely corrosive and the ammoniacal solutions have the disadvantage that ammonia is volatilized during absorption and desorption unless special procedures and equipment, generally involving very expensive refrigeration, are employed to prevent loss of ammonia. Consequentially commercial applications of previously available cuprous salt solutions for the recovery of carbon monoxide have been necessarily limited and somewhat complicated. In addition these solutions have not possessed the capacity to absorb a sufficiently large amount of carbon monoxide per unit of solution.

The principal object of the present invention is to provide an improved method of absorbing carbon monoxide. Another object is to provide an improved process for the removal and recovery of carbon monoxide from a gaseous mixture containing the same. Another object is to provide an improved cuprous salt-containing reagent solution for the absorption of carbon monoxide.

The accompanying drawing portrays diagrammatically a typical arrangement of equipment for removal, in accordance with our invention, of carbon monoxide from gas streams containing the same.

The present invention provides a new and improved solvent for cuprous salts such as cuprous chloride which can be used in a scrubbing tower of conventional design to remove readily carbon monoxide from such gas streams as water gas, blue gas, producer gas, flue gases and the like. In the process of our invention ortho anisidine is used as the solvent for the cuprous salt such as cuprous chloride. This solvent is capable of dissolving up to 20 per cent of its weight of cuprous chloride.

In its broadest aspect our invention comprises a method of absorbing carbon monoxide by contacting a gas comprising carbon monoxide with a solution of a cuprous salt in ortho anisidine, thereby effecting solution of the carbon monoxide in said solution.

In a typical embodiment, our invention is a process for the removal of carbon monoxide from a gaseous mixture containing the same together with at least one other gaseous material which comprises contacting the gaseous mixture with a solution of a cuprous salt in ortho anisidine and thereby effecting preferential solution of the carbon monoxide in the solution, separating the resulting carbon monoxide-containing solution from the undissolved gaseous material, and desorbing the carbon monoxide from the resulting solution. In this way there is accomplished not only separation of the carbon monoxide from the other gaseous material initially in admixture therewith but also recovery of the absorbed carbon monoxide in concentrated form. The recovery of the carbon monoxide is usually effected by subjecting the carbon monoxide-containing solution resulting from the contacting step and after separation of said solution from the undissolved gaseous material, which separation is ordinarily carried out by simply withdrawing the carbon monoxide-rich solution from the scrubbing zone, to at least one of pressure reduction or heating to cause liberation of the absorbed carbon monoxide.

The carbon monoxide is probably held in the form of a soluble carbon monoxide-cuprous salt complex or addition compound which is capable of being dissociated by reducing the pressure or applying heat or both.

The contact or absorption step is conducted with the carbon monoxide-containing material in the gaseous state. This step is carried out in the fashion of ordinary gas scrubbing.

We have discovered that ortho anisidine dissolves unexpectedly large quantities of cuprous salts (in excess of 15 per cent) and that the resulting solutions have a high capacity for dissolving carbon monoxide. These solutions have a higher capacity for dissolving carbon monoxide than any disclosed in the prior art with which we are familiar. This capacity is a distinct advantage, since smaller-scale equipment may be used to effect a given carbon monoxide separation. It is especially advantageous when the concentration of carbon monoxide in the feed is comparatively low.

Any suitable method of contacting the gases containing carbon monoxide with the liquid solution of cuprous salt may be employed. The preferred procedure is to contact countercurrently the gaseous feed mixture with the liquid reagent in a tower provided with bubble plates or other contact elements such as sprays, packing, baffles, etc.

If desired, means may be provided for mechanical agitation of the scrubbing liquid (i. e., the reagent solution) and the carbon monoxide-containing gas in order to greatly increase the rate of dissolving carbon monoxide. The rate of dissolving carbon monoxide may be quite slow in the absence of such mechanical agitation. Instead of positively agitating, as by means of a rotated stirrer, we may use any suitable means for attaining fine subdivision of the gas and scrubbing solution and the desired high degree of intimacy of contact therebetween. Thus the scrubbing tower may be provided with orifices, porous plates, perforated trays, baffles, the usual bubble trays, etc. In some cases a combination of stirring and baffling may be employed. Rapidly rotating turbines which trap the gas and divide it into small bubbles more readily absorbed by the liquid may be used.

Generally the solution of cuprous salt in ortho anisidine is injected continuously into the top of the scrubbing tower and allowed to descend therein in intimate conuntercurrent contact with the ascending gas, the carbon monoxide-containing feed being injected continuously into the bottom of the tower. The gas withdrawn from the top is essentially or completely free from carbon monoxide. The carbon monoxide-containing scrubbing liquid is withdrawn continuously from the bottom of the tower. If it is not completely saturated with respect to carbon monoxide, a suitable portion may be recycled and introduced into the tower at a point which may be substantially below the point of introduction of the fresh reagent at the top. In this way the concentration of carbon monoxide may be caused to attain the desired level in the stream passed to the desorption step. The balance of the stream withdrawn from the bottom of the absorber or, in the case where no such recycling is employed, the entire stream so withdrawn is passed to the desorption step where it is treated to effect liberation of the dissolved carbon monoxide is concentrated form. The thus regenerated reagent solution is cooled and recycled to the absorber.

The conditions of absorption may vary over wide limits so long as they are such that the carbon monoxide is preferentially dissolved while the other gaseous material present is not dissolved to any substantial extent. The pressure and temperature are the two principal conditions which will be varied to obtain the desired result. Generally the pressure and temperature at which the absorption is conducted are adjusted or selected with reference to one another. Generally speaking, the absorber is operated at a pressure of from atmospheric to about 15 pounds per square inch gage and at a temperature in the range of from 50 to 100° F. However pressures considerably higher than 15 pounds per square inch gage may be employed. Likewise temperatures outside the range given may be used. The temperature must not be so low as to cause solidification of the reagent solution. At temperatures below the normal freezing point of the reagent, it may be necessary to use an anti-freeze as the diluent for the reagent. Any suitable inert organic liquid may be used for this purpose, examples being methyl alcohol, ethyl alcohol, acetone, etc.

Desorption of the carbon monoxide from the resulting solution is suitably conducted by increasing the temperature of the carbon monoxide-enriched solution or by releasing or reducing the pressure on the solution. A combination of these methods is very satisfactory and is generally preferred. In general the desorption pressure is below atmospheric, say from 40 mm. upwards. The desorption temperature generally ranges from 100 to 250° F. and preferably from 150 to 212° F.

The strength of the solution of cuprous salt in ortho anisidine, i. e. the percentage by weight of cuprous salt based on the weight of the solution may vary within wide limits. Ordinarily it will range from 5 per cent up to saturation at the temperature employed in the absorption step. The more nearly saturated the solution the more economical is the process because the greater is the capacity of the solution for dissolving carbon monoxide and the lower is the rate of circulation and the smaller the equipment required for a given throughput of carbon monoxide-containing gas. A saturated solution of cuprous chloride in ortho anisidine at room temperature will contain over 15 per cent of cuprous chloride.

In some cases an excess of cuprous salt over the amount required to give a saturated solution may be employed with good results. Such excess should be finely divided to give a smooth slurry.

The reagent is usually in the form of a simple solution of the cuprous salt dissolved in ortho anisidine. However in some circumstances we may dispose the solution on a suitable adsorptive or absorptive solid carrier such as pumice, diatomaceous earth, sawdust, etc., in which case the method of operation will be modified somewhat from that employed when the liquid reagent is used.

The reagent preferably consists of the cuprous salt, such as cuprous chloride, and ortho anisidine. However in unusual situations an anti-freeze liquid may be included in the reagent as explained above.

As a cuprous salt we prefer to use cuprous chloride. Cuprous chloride is readily available at relatively low cost. However other cuprous salts such as cuprous nitrate, iodide, bromide, formate, acetate, butyrate, etc., or any other cuprous salt which is soluble in ortho anisidine may be employed within the scope of our invention.

The gas or gases in admixture with the carbon monoxide in the original feed may comprise any gas which does not react with or dissolve in the reagent. The invention is especially adaptable for the separation of carbon monoxide from hydrogen and/or nitrogen, particularly for the separation of carbon monoxide from a mixture of carbon monoxide and hydrogen so as to recover and reblend the carbon monoxide with hydrogen to give a proper carbon monoxide to hydrogen ratio for use as synthesis gas in such processes as the Fischer-Tropsch, OXO process, and the like. The normally gaseous paraffin hydrocarbons such as methane, ethane, and propane, if encountered in admixture with carbon monoxide, may be readily separated therefrom by the process of the present invention. Other examples of gases which may be in admixture with the carbon monoxide are helium and argon.

Examples of gaseous materials which should not be present in the feed are oxygen, sulfur compounds such as hydrogen sulfide, sulfur dioxide, carbonyl sulfide, mercaptans and the like, olefins, diolefins and acetylenes, ammonia and the lower aliphatic amines such as methylamine. Oxygen causes oxidation of the reagent and therefore should be excluded. The sulfur compounds enumerated react with the solution. The olefins, diolefins and acetylenes form addition compounds or complexes and therefore should be excluded.

In the drawing, a solution of cuprous chloride in ortho anisidine is prepared by agitation in vessel 1. This solution may conveniently contain 20 per cent by weight of cuprous chloride. A suitable volume of this solution is pumped via lines 2 and 3 into the top of a suitable absorbing tower 4 which may be of either plate or packed construction. A small amount of the solution is added continuously or intermittently via line 2 to make up for mechanical losses during operation.

The gas stream containing carbon monoxide enters the bottom of the tower 4 via line 5 and flows through the tower countercurrently to the descending solution. The purified gas is withdrawn via line 6 from the top of the absorber 4. The absorber tower may be operated at a pressure of from atmospheric to about 15 pounds per square inch gage or higher and at a temperature of from 50 to 100° F.

The solution, which now contains the cuprous chloride-carbon monoxide complex, is withdrawn from the bottom of tower 4 via line 7, passed through heat exchanger 8 where the temperature is raised to within the range of 100 to 250° F., preferably 150 to 212° F., and then passed to a desorber tower 9 where the pressure is lowered below that prevailing in absorber 4 and preferably to below atmospheric, ranging downwardly to 40 mm. Pure carbon monoxide is withdrawn via line 10 from the top of the desorber 9. The regenerated solution is withdrawn via line 11 from the bottom of desorber 9. The regenerated solution is then cooled in cooler 12 to a suitable temperature, say 50° F. and is returned to the top of absorber 4 via lines 13 and 3.

Many advantages flow from the practice of the present invention. The solution has a very high absorption capacity for carbon monoxide; thus the amount of solution handled in the process is reduced. The solution is stable since it does not contain any volatile component. No loss of ammonia is involved as has been the case when ammoniacal solutions were used. The solution exhibits excellent thermal stability. The solution is practically noncorrosive and the use of special alloy equipment is therefore unnecessary. Complete recovery of the dissolved carbon monoxide by desorption may be readily accomplished in a simple and economical manner. The solution is long-lasting so that chemical consumption is low.

Many processes in which the improved absorption step of our invention is advantageous will be evident to those skilled in the art. Under controlled conditions, the absorption of carbon monoxide in a solution of a cuprous salt in ortho anisidine is quantitative and can be used in analytical procedures and the like. For example the solution may be used in place of that commonly employed for the determination of carbon monoxide in the usual Orsat equipment.

*Example*

In a specific run illustrating the process of the present invention, 5.2 cc. of cuprous chloride-ortho anisidine solution containing 11.9 per cent by weight of cuprous chloride was contacted with carbon monoxide. This amount of solution absorbed 127 cc. of carbon monoxide measured at 739 mm. and 80° F. or a specific absorptivity of 21.7 cc./cc. at STP. The rich solution was then desorbed in a stepwise manner at 75° F. and under various pressures. In the desorption, 9.6 per cent of the carbon monoxide was recovered at 306 mm., 38.7 per cent at 119 mm., and 58.7 per cent at 57 mm. A pressure of about 10 mm. of mercury is required to remove totally the carbon monoxide from this solution at 80° F. The above percentages of recovered carbon monoxide are cumulative.

In some cases the principle underlying the present invention may be so employed as to provide a method of storage of carbon monoxide. For example carbon monoxide may be absorbed in the solution of cuprous salt in ortho anisidine and this solution may be stored until it is desired to recover the carbon monoxide by desorption. In some cases it may be desirable to ship the carbon monoxide-rich solution from the point of absorption to the point of utilization of carbon monoxide. Storage of such a solution is highly advantageous over the usual methods of storing carbon monoxide. For example such a solution may be stored in ordinary closed containers not adapted to withstand pressures. Such solutions are noncorrosive and stable over extended periods of time.

Since the reagent used in our invention is also highly effective for the solution of monoolefins and diolefins (see the copending application of one of us Serial No. 664,747 filed April 25, 1946, now abandoned, the subject matter of which is covered in application Serial No. 32,356, filed June 11, 1948) it will be evident to those skilled in the art that the present invention is not applicable to effect the separation of carbon monoxide from admixture with monoolefins or diolefins. However mixtures of olefins or diolefins with carbon monoxide will practically never be encountered. Moreover if they are encountered, other methods are available for such separations. For example ordinary fractional distillation or condensation may be used to separate the monoolefins or the diolefins from carbon monoxide. The separation of ethylene from carbon monoxide may be difficult but can be accomplished by the use of moderate refrigeration.

We claim:

1. The method which comprises contacting a gas comprising carbon monoxide with a solution of a cuprous salt in ortho anisidine and thereby effecting solution of the carbon monoxide in said solution.

2. A process for the removal of carbon monoxide from a gaseous mixture containing same which comprises contacting said mixture with a solution of a cuprous salt in ortho anisidine and effecting solution of the carbon monoxide in said solution.

3. A process for the removal of carbon monoxide from a gaseous mixture containing same which comprises contacting said mixture with a solution of cuprous chloride in ortho anisidine and effecting solution of the carbon monoxide in said solution.

4. A process for the separation and recovery of carbon monoxide from a gaseous mixture containing same which comprises contacting said mixture with a solution of a cuprous salt in ortho anisidine and thereby effecting preferential solution of the carbon monoxide in said solution, and thereafter desorbing the resulting solution.

5. A process for the separation and recovery of carbon monoxide from a gaseous mixture containing same which comprises contacting said mixture with a solution of a cuprous salt in ortho anisidine at a pressure of from 0 to 15 pounds per square inch gage and a temperature of from 50 to 100° F. and thereby effecting preferential solution of the carbon monoxide in said solution, and thereafter desorbing the resulting solution by heating to a higher temperature ranging from 100 to 250° F. and reducing the pressure to a lower value ranging between 40 and 760 mm. of mercury absolute.

6. A process for the separation and recovery of carbon monoxide from a gaseous mixture containing same which comprises contacting said mixture with a solution of cuprous chloride dissolved in a solvent comprised predominantly of ortho anisidine, said solution containing at least 5% of cuprous chloride by weight based on the weight of said solution, at a pressure of from 0 to 15 pounds per square inch gauge and a temperature of from 50 to 100° F. and thereby effecting preferential solution of the carbon monoxide in said solution, thereafter desorbing the resulting solution in a separate zone by lowering the pressure to subatmospheric and raising the temperature to from 150 to 212° F., and recovering the carbon monoxide so liberated in substantially pure form.

7. The process for separating carbon monoxide from a gas containing same in admixture with at least one other gaseous material, and which is free from other gaseous material reactive with and capable of forming a complex with cuprous salts which comprises intimately contacting said gas with a reagent consisting of a solution of a cuprous salt in ortho anisidine and thereby effecting preferential dissolution of said carbon monoxide in said solution while allowing the other gaseous material to remain substantially undissolved, separating the resulting carbon monoxide-containing solution from the undissolved gaseous material, and desorbing the carbon monoxide from said resulting solution.

8. A process for separating and recovering carbon monoxide from a gaseous mixture containing same in admixture with a least on other gaseous material, said mixture being free from other gaseous material reactive with and capable of forming a complex with cuprous salts, which comprises the following steps: contacting said mixture with a solution of a cuprous salt dissolved in a solvent comprised predominantly of ortho anisidine, said solution containing at least 5 per cent of said cuprous salt by weight based on the weight of said solution, said contacting being carried on at a pressure of from 0 to 15 pounds per square inch gauge and a temperature of from 50 to 100° F., thereby effecting preferential solution of said carbon monoxide in said solution; desorbing a resulting solution in a separate zone by lowering the pressure to subatmospheric and raising the temperature to from 150 to 212° F., and recovering carbon monoxide so liberated.

9. The process of claim 8 wherein the cuprous salt is cuprous chloride.

10. The process of claim 8 wherein the cuprous salt is cuprous acetate.

11. The process of claim 8 wherein the cuprous salt is cuprous nitrate.

12. The process of claim 8 wherein the cuprous salt is cuprous bromide.

13. The process of claim 8 wherein the cuprous salt is cuprous formate.

14. A process for the separation and recovery of carbon monoxide from a gaseous mixture containing same in admixture with hydrogen which comprises, contacting said mixture with a solution of a cuprous salt in ortho anisidine and thereby effecting preferential solution of carbon monoxide in said solution, and thereafter desorbing a resulting solution.

15. A process for the separation and recovery of carbon monoxide from a gaseous mixture containing same in admixture with hydrogen which comprises, contacting said mixture with a solution of a cuprous salt in ortho anisidine at a pressure of from 0 to 15 pounds per square inch gauge and at a temperature of from 50 to 100° F. and thereby effecting preferential solution of carbon monoxide in said solution, and thereafter desorbing a resulting solution by heating to a higher temperature ranging from 100 to 250° F. and reducing the pressure to a lower value ranging between 40 and 760 mm. of mercury absolute.

16. A process for the separation and recovery of carbon monoxide from a gaseous mixture containing same in admixture with hydrogen which comprises, contacting said mixture with a solution of cuprous chloride dissolved in a solvent comprised predominantly of ortho anisidine, said solution containing at least 5 per cent of cuprous chloride by weight based on the weight of said solution, at a pressure of from 0 to 15 pounds per square inch gauge and a temperature of from 50 to 100° F. and thereby effecting preferential solution of the carbon monoxide in said solution, thereafter desorbing the resulting solution in a separate zone by lowering the pressure to subatmospheric and raising the temperature to from 150 to 212° F., and recovering carbon monoxide so liberated in substantially pure form.

17. A process for separating and recovering carbon monoxide from a gaseous mixture consisting essentially of carbon monoxide, hydrogen and nitrogen, said mixture being free from other gaseous material reactive with and capable of forming a complex with cuprous salts, which comprises the following steps: contacting said mixture with a solution consisting of a cuprous salt dissolved in ortho anisidine, said solution containing said cuprous salt in an amount equal to from 5 weight per cent to an amount necessary to saturate said solution at the temperature of said contacting, said contacting being carried on at a pressure of from 0 to 15 pounds psig and a temperature of from 50 to 100° F., thereby effecting preferential solution of carbon monoxide in said solution; desorbing a resulting solution in a separate zone by lowering the pressure to from 40 mm. of mercury absolute to atmospheric and raising the temperature to from 150 to 212° F., and recovering carbon monoxide so liberated.

18. The process of claim 17 wherein the cuprous salt is cuprous chloride.

19. The process of claim 17 wherein the cuprous salt is cuprous acetate.

20. The process of claim 17 wherein the cuprous salt is cuprous nitrate.

21. The process of claim 17 wherein the cuprous salt is cuprous bromide.

22. The process of claim 17 wherein the cuprous salt is cuprous formate.

GARDNER C. RAY.
PAUL H. JOHNSON.

REFERENCES CITED

The following references are of record in the file of this patent:

UNITED STATES PATENTS

| Number | Name | Date |
| --- | --- | --- |
| 2,395,529 | Arnold | Feb. 26, 1946 |

Certificate of Correction

Patent No. 2,519,284                                           August 15, 1950

GARDNER C. RAY ET AL.

It is hereby certified that error appears in the printed specification of the above numbered patent requiring correction as follows:

Column 1, line 27, for "Consequentially" read *Consequently*; column 3, line 22, for "conuntercurrent" read *countercurrent*; line 42, for the words "monoxide is" read *monoxide in*; column 7, line 41, for "on other" read *one other*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*